(12) United States Patent
Okita et al.

(10) Patent No.: US 8,199,235 B2
(45) Date of Patent: Jun. 12, 2012

(54) IMAGE SENSING DEVICE AND IMAGING SYSTEM

(75) Inventors: Akira Okita, Yamato (JP); Satoshi Suzuki, Hiratsuka (JP); Takashi Matsuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 390 days.

(21) Appl. No.: 12/533,446

(22) Filed: Jul. 31, 2009

(65) Prior Publication Data
US 2010/0053396 A1    Mar. 4, 2010

(30) Foreign Application Priority Data
Aug. 29, 2008    (JP) .................................. 2008-222794

(51) Int. Cl.
*H04N 5/335* (2011.01)
(52) U.S. Cl. ........................................ 348/301; 348/302
(58) Field of Classification Search .................. 348/301, 348/302, 250, 208.1
See application file for complete search history.

(56) References Cited

U.S. PATENT DOCUMENTS

| | | | | |
|---|---|---|---|---|
| 7,141,775 B2 | 11/2006 | Koseki | ......................... | 250/208.1 |
| 7,321,110 B2 | 1/2008 | Okita et al. | ................. | 250/208.1 |
| 7,456,880 B2 | 11/2008 | Okita et al. | ..................... | 348/243 |
| 7,466,003 B2 | 12/2008 | Ueno et al. | ...................... | 257/462 |
| 7,514,732 B2 | 4/2009 | Okita et al. | ..................... | 257/292 |
| 7,538,810 B2 | 5/2009 | Koizumi et al. | .............. | 348/308 |
| 7,557,847 B2 | 7/2009 | Okita et al. | ..................... | 348/308 |
| 2005/0195307 A1 | 9/2005 | Sakurai et al. | ................. | 348/308 |
| 2006/0017504 A1 * | 1/2006 | Deval et al. | .................... | 330/253 |
| 2008/0036891 A1 | 2/2008 | Ono et al. | ....................... | 348/308 |
| 2008/0055445 A1 * | 3/2008 | Hatano et al. | .................. | 348/302 |
| 2008/0273093 A1 | 11/2008 | Okita et al. | ............... | 348/220.1 |
| 2009/0033781 A1 | 2/2009 | Okita et al. | ..................... | 348/308 |
| 2009/0102955 A1 | 4/2009 | Hiyama et al. | ................. | 348/301 |
| 2009/0147117 A1 | 6/2009 | Suzuki et al. | .................. | 348/294 |
| 2009/0218477 A1 | 9/2009 | Okita et al. | ............... | 250/214 A |

FOREIGN PATENT DOCUMENTS

| | | |
|---|---|---|
| JP | 2001-230974 A | 8/2001 |
| JP | 2005-217158 A | 8/2005 |
| JP | 2005-252529 A | 9/2005 |
| JP | 2006-311348 A | 11/2006 |
| JP | 2007-124641 A | 5/2007 |
| JP | 2008-042679 A | 2/2008 |

\* cited by examiner

*Primary Examiner* — Sinh Tran
*Assistant Examiner* — Shahbaz Nazrul
(74) *Attorney, Agent, or Firm* — Fitzpatrick, Cella, Harper & Scinto

(57) ABSTRACT

An image sensing device includes a pixel array in which a plurality of pixels are arrayed, and a plurality of column amplification units that amplify a plurality of signals that are output in parallel from the pixel array. Each of the column amplification units includes a differential amplifier including an amplification unit and a constant current circuit, with the amplification unit amplifying a signal that is output from the pixels and outputting the signal to an output node, and the constant current circuit being arranged between the amplification unit and a ground terminal and supplying a current to the amplification unit. Each amplification unit also includes a clip unit that clips a voltage of the output node when the differential amplifier amplifies the signal and thereby clipping a voltage of a connection node connecting the amplification unit to the constant current circuit in the differential amplifier.

10 Claims, 9 Drawing Sheets

IMAGE SENSING DEVICE AND IMAGING SYSTEM

BACKGROUND OF THE INVENTION

1. Field of the Invention

The present invention relates to an image sensing device and an imaging system.

2. Description of the Related Art

Japanese Patent Laid-Open No. 2001-230974 discloses that the greater a signal level of an optical signal output from a pixel to each of vertical output lines V1 to V3 is, the lower a voltage of each of the vertical output lines V1 to V3 is, in a solid-state image sensing device as shown in FIG. 9 of Japanese Patent Laid-Open No. 2001-230974. In this case, in the solid-state image sensing device shown in FIG. 9 of Japanese Patent Laid-Open No. 2001-230974, in a column where a signal of a pixel on which very strong light is incident is read out to a vertical output line (any one of V1 to V3), the source-drain voltage of a load MOS (corresponding one of M51 to M53) connected to the vertical output line drops to 0 V so that the load MOS is turned OFF. When the load MOSs M51 to M53 are turned OFF, the voltage drop across a GND line 4 decreases. Because of this, output voltages of dark pixels and optical black (OB) pixels are different between a row including a pixel on which strong light is incident and a row that does not include such a pixel. As a result of this, in an image including a strong spot light, an abnormality occurs in a signal level of pixels on the right and left of the spot light, so that a luminance-incremented white band output or conversely, a darkening black band output occurs. In other words, horizontal smear occurs.

To address this, Japanese Patent Laid-Open No. 2001-230974 discloses that when an optical signal is output from a pixel, the vertical output lines V1 to V3 are clipped so that the voltage thereof will not drop so as to be equal to or lower than the drain voltage that allows the load MOSs M51 to M53 to operate in a saturation region, as shown in FIG. 1 of Japanese Patent Laid-Open No. 2001-230974. Consequently, according to Japanese Patent Laid-Open No. 2001-230974, since it is possible to prevent a load MOS from being tuned OFF, an abnormality in a signal level in a row including a pixel on which strong light is incident can be reduced. Thus, horizontal smear in the obtained image can be reduced.

Japanese Patent Laid-Open No. 2005-217158 discloses that an operational amplifier 120 amplifies a signal output from a pixel to a vertical output line 106, and the amplified signal is accumulated in an accumulation capacitance 112, as shown in FIG. 3 of Japanese Patent Laid-Open No. 2005-217158. In this operational amplifier 120, a source grounded field effect transistor of a constant current circuit is connected between an input transistor 125 and a GND wiring 132 as show in FIG. 2 of Japanese Patent Laid-Open No. 2005-217158.

Japanese Patent Laid-Open No. 2008-042679 discloses that when a noise level corresponding to a pixel reset state is output from an operational amplifier 10 to a noise transmission path NT, a first clip transistor 19 clips the potential of the noise transmission path NT, as shown in FIG. 3 of Japanese Patent Laid-Open No. 2008-042679. The drain of the first clip transistor 19 is connected to an output terminal of the operational amplifier 10, and its source is connected to a capacitance 14 for holding a noise level via a transmission transistor 12. Consequently, according to Japanese Patent Laid-Open No. 2008-042679, a voltage supplied from the operational amplifier 10 via the noise transmission path NT to and accumulated in the capacitance 14 is kept from being higher than an original reset level, thus enabling suppression of darkening.

On the other hand, in an image sensing device in which a differential amplifier in each column amplifies a signal output from a pixel in each column in a pixel array to a vertical output line and outputs the amplified signal to an output amplifier, a horizontal smear in an image corresponding to an image signal cannot be sufficiently suppressed when some of the pixels are irradiated with strong light.

For example, when some of the pixels are irradiated with strong light, an optical signal whose signal level is excessive is output from the some pixels to the vertical output lines. At this time, even though a MOS transistor is going to clip a potential of each of the vertical output lines, an optical signal whose signal level is excessive flows in the differential amplifier until the MOS transistor is turned ON. In this case, when the differential amplifier amplifies an optical signal, a constant current circuit included in the differential amplifier supplies an excessive current to a ground line. Due to an influence of this, it is impossible for a differential amplifier in another column to output an appropriate signal. Accordingly, a horizontal smear occurs in an image obtained corresponding to an image signal output from the image sensing device.

SUMMARY OF THE INVENTION

The present invention provides for suppressing a horizontal smear due to a differential amplifier amplifying a signal corresponding to an optical signal output from a pixel in each column in an image sensing device.

An image sensing device according to a first aspect of the present invention comprises: a pixel array in which a plurality of pixels are arrayed; and a plurality of column amplification units that amplify a plurality of signals that are output in parallel from the pixel array, wherein each of the column amplification units includes: a differential amplifier including an amplification unit and a constant current circuit, the amplification unit amplifying a signal that is output from the pixels and outputting the signal to an output node, the constant current circuit being arranged between the amplification unit and a ground terminal and supplying a current to the amplification unit; and a clip unit that clips a voltage of the output node when the differential amplifier amplifies the signal and thereby clipping a voltage of a connection node connecting the amplification unit to the constant current circuit in the differential amplifier.

An imaging system according to a second aspect of the present invention includes the image sensing device according to the first aspect of the present invention, an optical system in which an image is formed on an image sensing surface of the image sensing device, and a signal processing unit that processes a signal output from the image sensing device so as to generate image data.

According to the present invention, it is possible to suppress a horizontal smear due to a differential amplifier amplifying a signal corresponding to an optical signal output from a pixel in each column in an image sensing device.

Further features of the present invention will become apparent from the following description of exemplary embodiments with reference to the attached drawings.

DESCRIPTION OF THE EMBODIMENTS

Figure 1:
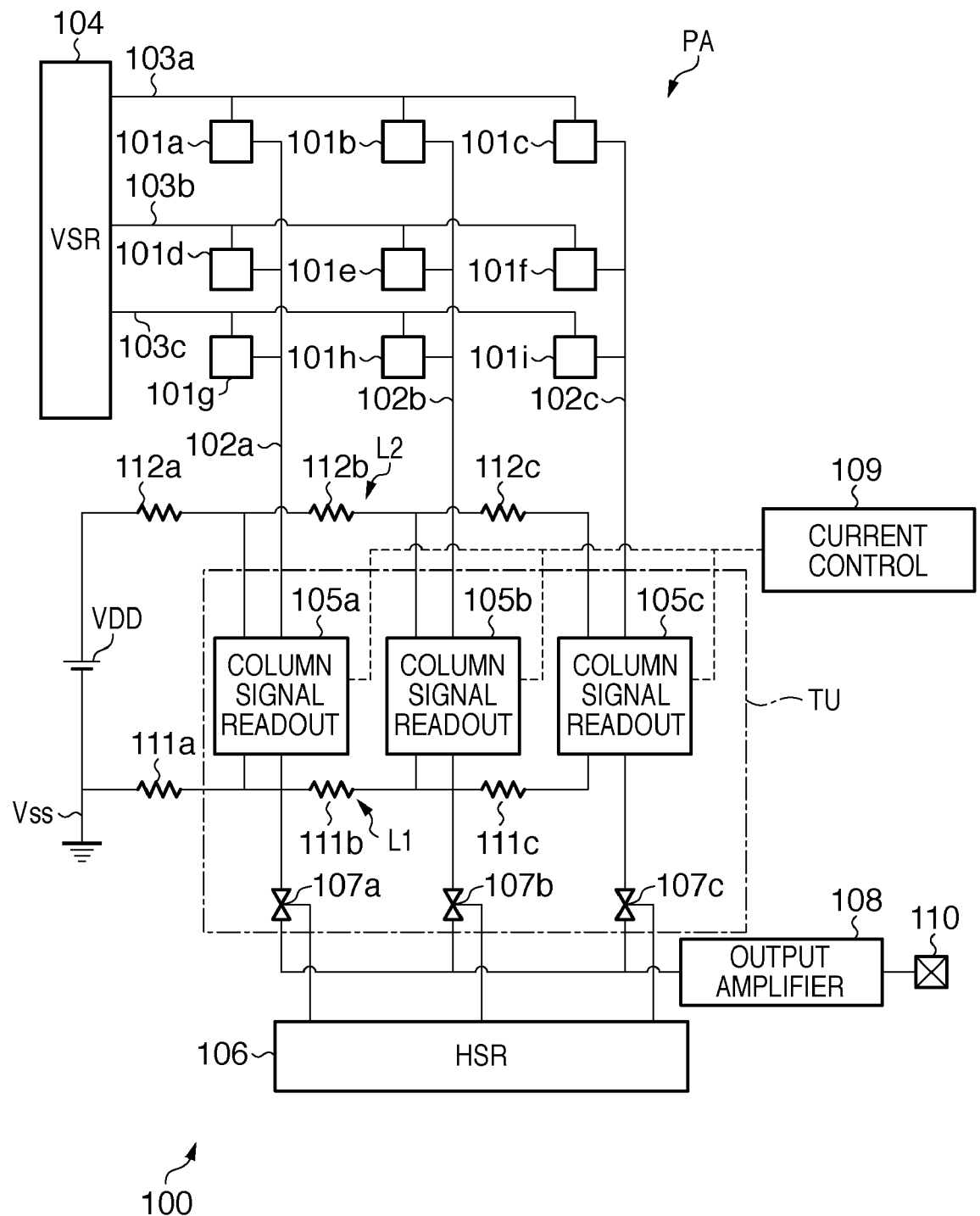
FIG. 1 is a diagram showing the configuration of an image sensing device 100 according to an embodiment of the present invention.

An image sensing device 100 according to an embodiment of the present invention will be described with reference to FIG. 1. FIG. 1 is a diagram showing the configuration of the image sensing device 100 according to this embodiment of the present invention.

The image sensing device 100 is provided with a pixel array PA, a vertical scanning circuit (VSR) 104, a transmission unit TU, a horizontal scanning circuit (HSR) 106, and an output amplifier 108.

In the pixel array PA, a plurality of pixels 101a to 101i are arrayed in the directions along a row and a column. In order to simplify description, FIG. 1 illustrates a case where a pixel array has three rows and three columns of pixels. The pixel array is not limited to this arrangement. The pixel array may have a still greater number of rows and columns of pixels, or may be arranged in a line.

The vertical scanning circuit 104 selects a readout row for signals to be read out in the pixel array PA by scanning the pixel array PA in the vertical direction (in the direction along a column). The vertical scanning circuit 104 puts the pixels in the readout row into a selected state by supplying an active-level selection control signal Psel via a row control line (one of 103a to 103c). Also, the vertical scanning circuit 104 drives the pixels in the readout row by supplying a transfer control signal Ptx or a reset control signal Pres via row control lines (not shown) for the readout row.

The transmission unit TU temporarily holds signals corresponding to (later-described) optical signals that are output from pixels in columns of the readout row in the pixel array PA to column signal lines 102a to 102c. Then, the transmission unit TU sequentially transmits a signal among signals corresponding to the held optical signals to the output amplifier 108. The image sensing device 100 has a configuration in which signals are output in parallel from the pixel array PA to the transmission unit TU. The transmission unit TU includes a plurality of column signal readout units (a plurality of column amplification units) 105a to 105c and a plurality of switches 107a to 107c. The plurality of column signal readout units 105a to 105c amplify the signals that are output in parallel from the pixel array PA. Each of the plurality of column signal readout units 105a to 105c temporarily holds a signal from a pixel in each column of the readout row. The plurality of column signal readout units 105a to 105c and the output amplifier 108 are electrically connected/disconnected by turning ON/OFF the plurality of switches 107a to 107c respectively.

The plurality of column signal readout units 105a to 105c are connected to a common ground line L1 so as to be supplied with a ground voltage Vss, and are connected to a common power supply line L2 so as to be supplied with a power supply voltage VDD. Parasitic resistances between the supply source in the ground line L1 and the plurality of column signal readout units 105a to 105c are denoted 111a to 111c, respectively. Parasitic resistances between the supply source in the power supply line L2 and the plurality of column signal readout units 105a to 105c are denoted 112a to 112c. Further, the plurality of column signal readout units 105a to 105c are connected to a current control unit 109 so as to be supplied with a bias voltage VB.

The horizontal scanning circuit 106 sequentially transfers signals of the columns that have been held by the transmission unit TU to the output amplifier 108 by scanning the transmission unit TU in the horizontal direction (the direction along a row). That is, the horizontal scanning circuit 106 sequentially turns ON the switches 107a to 107c in the columns so as to sequentially transfer the signals held by the column signal readout units 105a to 105c in the respective columns to the output amplifier 108.

The output amplifier 108 is provided as necessary and outputs a signal that is transferred from the transmission unit TU.

Figure 2:
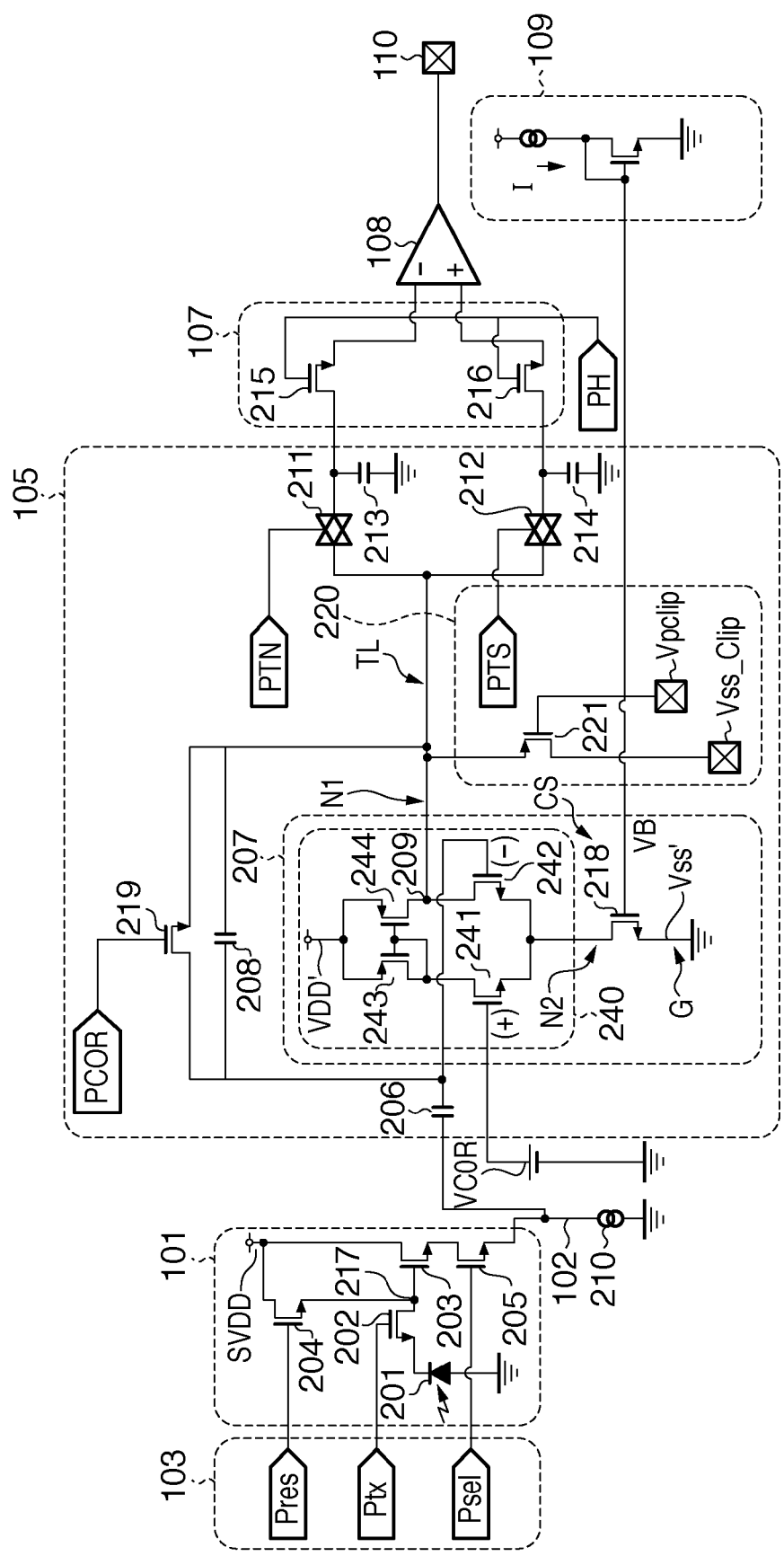
FIG. 2 is a diagram showing the circuit configuration from pixel to output amplifier in the image sensing device 100 according to an embodiment of the present invention.

An example of a configuration of each pixel 101 in the pixel array PA will be described with reference to FIG. 2. FIG. 2 is a diagram showing the circuit configuration from pixel to output amplifier in the image sensing device 100 according to the embodiment of the present invention. In FIG. 2, representative reference numerals, such as a denotation "the pixel 101" representing each of the pixels 101a to 101i, are shown.

As shown in FIG. 2, each pixel 101 (101a to 101i) includes a photoelectric conversion unit 201, a transfer unit 202, a charge-voltage converter 217, a reset unit 204, an output unit 203, and a selection unit 205.

The photoelectric conversion unit 201 generates charges corresponding to light and accumulates the charges. The photoelectric conversion unit 201 is, for example, a photodiode.

The transfer unit 202 transfers the charges generated by the photoelectric conversion unit 201 to the charge-voltage converter 217. The transfer unit 202 is, for example, a transfer transistor and transfers the charges generated by the photoelectric conversion unit 201 to the charge-voltage converter 217 by being turned ON when an active-level transfer control signal Ptx is supplied from the vertical scanning circuit 104 to its gate.

The charge-voltage converter 217 converts the transferred charges to a voltage. The charge-voltage converter 217 is, for example, an FD (Floating Diffusion) region.

The reset unit 204 resets the charge-voltage converter 217. The reset unit 204 is, for example, a reset transistor and resets the charge-voltage converter 217 by being turned ON when an active-level reset control signal Pres is supplied from the vertical scanning circuit 104 to its gate.

The output unit 203 outputs a signal corresponding to the voltage of the charge-voltage converter 217 to the column signal line 102 (102a to 102c). The output unit 203 is, for example, a source follower transistor and outputs a signal corresponding to the voltage of the charge-voltage converter 217 to the column signal line 102 by performing a source follower operation together with a constant current source 210 connected to the column signal line 102. That is, the output unit 203 outputs a noise signal corresponding to the voltage of the charge-voltage converter 217 to the column signal line 102 in a state where the reset unit 204 has reset the charge-voltage converter 217. The output unit 203 outputs an optical signal corresponding to the voltage of the charge-voltage converter 217 to the column signal line 102 in a state where the transfer unit 202 has transferred charges from the photoelectric conversion unit 201 to the charge-voltage converter 217.

The selection unit 205 puts the pixel 101 into a selected or a non-selected state. The selection unit 205 is, for example, a selection transistor and puts the pixel 101 into a selected state by being turned ON when an active-level selection control signal Psel is supplied from the vertical scanning circuit 104 to its gate. The selection unit 205 puts the pixel 101 into a non-selected state by being turned OFF when a non-active-level selection control signal Psel is supplied from the vertical scanning circuit 104 to its gate. According to a selection control signal from the vertical scanning circuit 104, signals from a plurality of pixels are output in parallel to the transmission unit TU.

The configuration of one of the column signal readout units 105 in the transmission unit TU will be described with reference to FIG. 2. The column signal readout unit is provided for each of the columns in the pixel array.

Each of the column signal readout units 105 (105a to 105c) includes a clamp capacitance 206, a differential amplifier 207, a feedback capacitance 208, a switch 219, a transmission line TL, switches 211 and 212, holding capacitances 213 and 214, and a clip unit 220.

The clamp capacitance 206 is connected between the column signal line 102 and an inverting input terminal (−) of the differential amplifier 207. A reference voltage VCOR is supplied to a non-inverting input terminal (+) of the differential amplifier 207. The feedback capacitance 208 and the switch 219 are connected in parallel between an output terminal 209 and the inverting input terminal (−) of the differential amplifier 207. The differential amplifier 207 includes a constant current circuit CS as described later.

The differential amplifier 207 amplifies a signal corresponding to an optical signal output from a pixel, or in other words, a difference signal corresponding to the difference between a noise signal and an optical signal, and outputs the amplified signal to an output node N1. After that, the differential amplifier 207 performs a clamp operation together with the clamp capacitance 206, the feedback capacitance 208, and the switch 219 so as to generate a difference signal corresponding to the difference between an optical signal and a noise signal which have been output from a pixel, and to amplify and output the signal. Note that an offset component is superposed on this difference signal.

Note that the column signal readout units 105 may be configured so as not to include the clamp capacitance 206. In this case, the differential amplifier 207 amplifies each of a noise signal and an optical signal which have been output from a pixel, and outputs each of the signals to the output node N1 at different timings. Specifically, the differential amplifier 207 amplifies a noise signal and outputs a signal in which an offset is superposed on the noise signal. After that, the differential amplifier 207 amplifies an optical signal and outputs a signal in which an offset is superposed on the optical signal. Then, the output amplifier 108 receives the signal in which an offset is superposed on the noise signal and the signal in which an offset is superposed on the optical signal from the column signal readout unit 105, generates the difference signal between these two signals, and then outputs the difference signal as an image signal in which the offset and the noise signal have been removed. It is also possible that differential processing of a pixel's noise signal is not performed. In this case, each column signal readout unit 105 performs processing only for the optical signal.

The output terminal 209 of the differential amplifier 207 is connected via the transmission line TL and the switch 211 to the holding capacitance 213, and is connected via the transmission line TL and the switch 212 to the holding capacitance 214. The differential amplifier 207 supplies its offset via the transmission line TL and the switch 211 to the holding capacitance 213. The holding capacitance 213 holds the offset of the differential amplifier 207. Also, the differential amplifier 207 supplies a signal in which the offset has been superposed on the difference signal, via the transmission line TL and the switch 212 to the holding capacitance 214. The holding capacitance 214 holds the signal in which the offset has been superposed on the difference signal. Then, the output amplifier 108 generates the difference signal between the offset received from the holding capacitance 213 and the signal received from the holding capacitance 214 so as to output the difference signal as an image signal. The holding capacitances 213 and 214 can have the same capacitance value.

Here, the differential amplifier 207 includes the constant current circuit CS and an amplification unit 240. The amplification unit 240 includes input transistors 241 and 242 and transistors 243 and 244.

The constant current circuit CS is configured so as to include an NMOS transistor 218 serving as a load and is arranged between the amplification unit 240 and a ground terminal G so as to let a current flow to the amplification unit 240. In response to this, the amplification unit 240 amplifies a difference signal corresponding to the difference between an optical signal and a noise signal which have been output from a pixel.

As for the NMOS transistor 218, a constant bias voltage VB is supplied to its gate from the current control unit 109, and a reference voltage Vss' ($\geq$Vss) is supplied to its source via the ground terminal G. The reference voltage Vss' has a value that is higher than the reference voltage Vss supplied from the supply source, in accordance with the parasitic resistances 111a to 111c in the ground line L1.

The sources of the input transistors (NMOS transistors) 241 and 242 are connected to the drain of the NMOS transistor 218. The gates of the input transistors 241 and 242 function as a non-inverting input terminal (+) and an inverting input terminal (−), respectively. The drains of the transistors (PMOS transistors) 243 and 244 are connected to the drains of the input transistors 241 and 242, respectively. The gates of the transistors 243 and 244 are connected to each other so as to configure a current mirror circuit. A power supply voltage VDD' ($\leq$VDD) is supplied to the sources of the transistors 243 and 244, respectively. The power supply voltage VDD' has a value that is lower than the power supply voltage VDD supplied from the supply source, in accordance with the parasitic resistances 112a to 112c in the power supply line L2.

In this differential amplifier 207, when a pixel is irradiated with strong light and thereby an optical signal whose level is excessive is output from the pixel to the vertical output line 102, a difference signal whose level is excessive is input to the gate of the input transistor 242. Then, the potential of the source of the input transistor 242 is raised so that the potential of the drain of the NMOS transistor 218 is also raised, and as a result of this, there is a possibility for the constant current circuit CS to supply an excessive current to the ground line L1 (see FIG. 1).

On the contrary, in this embodiment, the clip unit 220 restricts, when the differential amplifier 207 amplifies a difference signal corresponding to an optical signal, the voltage at the output node N1 of the differential amplifier 207 so that the constant current circuit CS does not supply an excessive current. That is, the clip unit 220 clips, when the differential amplifier 207 amplifies a difference signal, a voltage at the output node N1 of the differential amplifier 207 to a first clip voltage V1. Consequently, the clip unit 220 clips a voltage of a connection node N2, which connects the amplification unit 240 to the constant current circuit CS in the differential amplifier 207, to a second clip voltage V2. The second clip voltage V2 is lower than the first clip voltage V1.

Here, the clip unit 220 includes a MOS transistor 221, which restricts the voltage of the transmission line TL to the first clip voltage V1 or lower than that. The MOS transistor 221 is a PMOS transistor whose drain is connected to a reference voltage Vss_Clip, and whose source is connected to the transmission line TL. The gate of the MOS transistor 221 is supplied with a set voltage Vpclip, which causes the voltage at the source to be the first clip voltage V1 when the MOS transistor 221 is turned ON. Since the MOS transistor 221 is a PMOS transistor, the set voltage Vpclip has a value corresponding to the first clip voltage V1 minus the threshold voltage of the MOS transistor 221.

Note that the MOS transistor 221 may be an NMOS transistor. In this case, the set voltage supplied to the gate of the MOS transistor 221 has a value corresponding to the first clip voltage V1 plus the threshold voltage of the MOS transistor 221.

The MOS transistor 221, with its gate being supplied with a set voltage Vpclip, turns ON when the voltage of the transmission line TL reaches the first clip voltage V1 or higher than that, thereby clipping the voltage of the transmission line TL at the first clip voltage V1. Consequently, an increase of the potential of the output terminal 209 serving as the drain of the input transistor 242 is suppressed. Thus, a raise of the voltage at the source of the input transistor 242 (the voltage at the connection node N2) is also suppressed. That is, the MOS transistor 221 clips the voltage at the connection node N2 at the second clip voltage V2 by clipping the voltage of the transmission line TL at the first clip voltage V1. As a result of this, an increase in the potential of the drain of the NMOS transistor 218, which is included in the constant current circuit CS, is suppressed, and this prevents the constant current circuit CS from supplying an excessive current to the ground line L1.

As described above, the voltage at the output node N1 of the differential amplifier 207 is, when the differential amplifier 207 amplifies a difference signal corresponding to an optical signal, restricted so that the constant current circuit CS does not supply an excessive current flow. Accordingly, because an excessive current from the constant current circuit CS to the ground line L1 is suppressed, an abnormality in the signal level of a pixel in the same row as a part of which that has been irradiated with strong light can be sufficiently reduced, so that horizontal smear in the obtained image can be reduced.

Figure 3:
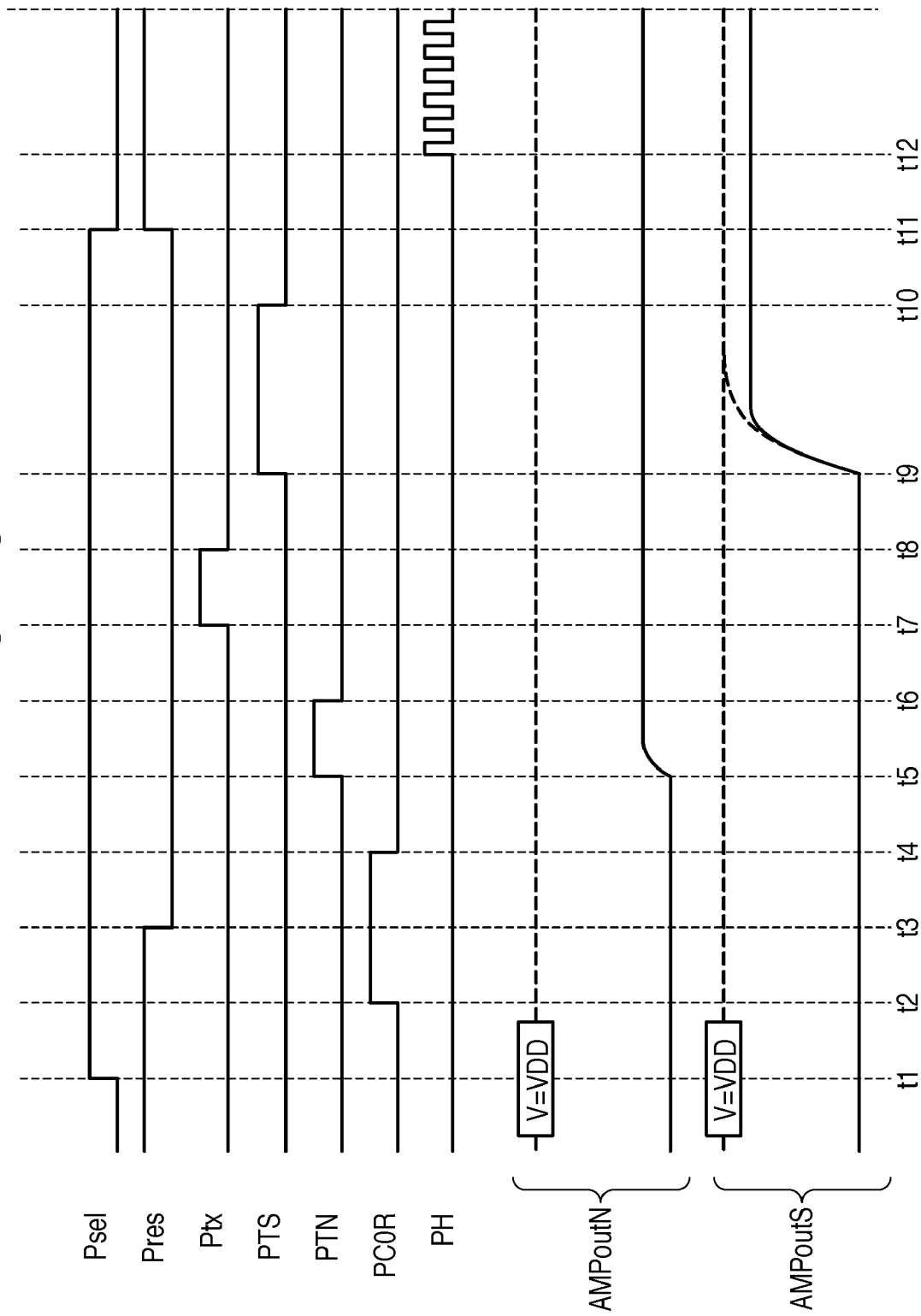
FIG. 3 is a timing chart showing an operation performed by the image sensing device 100 according to an embodiment of the present invention.

An operation performed by the image sensing device 100 according to the embodiment of the present invention will be described with reference to FIG. 3. FIG. 3 is a timing chart showing an operation performed by the image sensing device 100 according to the embodiment of the present invention.

When T=t1, in each pixel 101 in the readout row, a selection control signal Psel that is input to the gate of the selection unit 205 becomes H (high level) so that the output unit 203 enters an active state. In this state, a reset control signal Pres that is input to the gate of the reset unit 204 becomes H (high level) so that the charge-voltage converter 217 is reset with the reset voltage SVDD.

When T=t2, in the transmission unit TU, a clamp pulse PCOR becomes H, and the differential amplifier 207 enters a buffer state, outputting a reference voltage VCOR.

When T=t3, in each pixel 101 in the readout row, a reset control signal Pres that is input to the gate of the reset unit 204 becomes L (low level), the potential of the charge-voltage converter 217 is fixed at a reset level, and the output unit 203 outputs a noise signal VN to the column signal line 102. That is, noise signals of the readout row are output in parallel from the pixel array.

When T=t4, in the transmission unit TU, a clamp pulse PCOR is set to L, and the noise signal VN, which has been output to the column signal line 102, is clamped by a clamp capacitance C0 (an operation of an N signal reading).

When T=t5, in the transmission unit TU, a PTN pulse is set to H so as to turn the switch 211 ON, and a signal in which a reference voltage VCOR and an offset of the differential amplifier 207 have been superposed is started to be written into the holding capacitance 213.

When T=t6, the writing operation is finished in the transmission unit TU. The change in voltage at the output terminal 209 of the differential amplifier 207 at that time is shown as AMPoutN in FIG. 3.

When T=t7, in each pixel 101 in the readout row, a pulse Ptx that is input to the gate of the transfer unit 202 is set to H, and signal charges of the photoelectric conversion unit 201 are transferred to the charge-voltage converter 217.

When T=t8, the transfer operation is finished in each pixel 101 in the readout row. The output unit 203 outputs an optical signal VS to the column signal line 102. That is, optical signals of the readout row are output in parallel from the pixel array.

When T=t9, in the transmission unit TU, a PTS pulse is set to H so as to turn the switch 212 ON, and a signal is written into the holding capacitance 214. The change in voltage at the output terminal 209 of the differential amplifier 207 at that time is shown as AMPoutS in FIG. 3 (an operation of an S signal reading). A signal in which a reference voltage VCOR and an offset of the differential amplifier 207 have been superposed on a signal in which a difference signal (VS−VN) between the optical signal VS and the noise signal VN has been invertingly amplified at a ratio of a capacitance value C0 of the clamp capacitance 206 to a capacitance value Cf of the feedback capacitance 208 (C0/Cf), is written into the holding capacitance 214.

When T=t10, the writing operation is finished in the transmission unit TU.

When T=t11, in each pixel 101 in the readout row, the reset control signal Pres is set to H so as to turn the reset unit 204 ON, thereby resetting the charge-voltage converter 217, and also a selection control signal Psel is set to L so as to turn the selection unit 205 OFF, thereby completing the output operation from the readout row.

When T=t12, the horizontal scanning circuit 106 sequentially sets a PH pulse for each column to H so as to sequentially turn the column selection switches 215 and 216 in the columns ON. Accordingly, the output amplifier 108 outputs a signal of each column.

Consider a case where the MOS transistor 221 of the clip unit 220 is not arranged in the column signal readout unit 105. In this case, when an optical signal having an excessive signal level is output from the pixel 101 to the column signal line 102, the potential of the column signal line 102 falls so that the potential of the input terminal of the differential amplifier 207 falls. With this operation, the potential of the output terminal 209 of the differential amplifier 207 rises to a level close to the power supply voltage VDD as shown by the dotted line for AMPoutS in FIG. 3. Particularly, when the ratio of the capacitance value C0 of the clamp capacitance 206 to the capacitance value Cf of the feedback capacitance 208 (C0/Cf) is high, the potential of the output terminal 209 of the differential amplifier 207 easily rises to a level close to the power supply voltage VDD.

At this time, the differential amplifier 207 is operating in the triode region, not in the pentode region in which the differential amplifier 207 is supposed to be operating. With this operation, the differential amplifier 207 can lose its balance, and the potential at the drain of the NMOS transistor 218 of the differential amplifier 207 can fluctuate, so that the current that the constant current circuit CS supplies to the ground line L1 can change.

In this case, assume that, in FIG. 1, strong light is incident only on the pixel 101e, and no light is incident on pixels other than the pixel 101e, that is, the pixels 101a to 101d and 101f to 101i.

Under this assumption, the differential amplifiers that receive the signals that are output from the pixels 101a to 101c operate in the pentode region both when performing the operation of N signal reading and when performing the operation of S signal reading. Consequently, stable currents Ia, Ib, and Ic flow from a constant current circuit to the ground line L1.

On the other hand, differential amplifiers that receive the signals that are output from the pixels 101d to 101f operate in the pentode region when performing the operation of N signal reading. Accordingly, stable currents Ia, Ib, and Ic flow from the constant current circuit to the ground line L1. However, when performing the operation of S signal reading, although the differential amplifiers that receive the signals that are output from the pixels 101d and 101f operate in the pentode region, the differential amplifier that receives a signal output from the pixel 101e operates in the triode region. The differential amplifier of the column signal readout unit 105b supplies the current Ib+Δib to the ground line L1. As a result of this, due to the influence from the parasitic resistance 111a in the ground line L1, each reference voltage supplied to the column signal readout unit 105a is changed by R111a×Δib. Similarly, the reference voltage supplied to the column signal readout units 105b and 105c is changed by (R111a+R111b)×Δib. R111a is the resistance of the parasitic resistance 111a, and R111b is the resistance of the parasitic resistance 111b.

Consequently, the source potential of the NMOS transistor 218, which determines the current that flows through the differential amplifiers of the column signal readout units 105a and 105c, fluctuates. Thus, an operating point of the differential amplifiers changes between when performing the operation of N signal reading and when performing the operation of S signal reading, so that the output signal fluctuates. That is, the reference voltage for signals from the pixels 101d to 101f differs from the reference voltage for signals from the pixels 101a to 101c and 101g to 101i. As a result, white band or black band output fluctuation occurs in a horizontal direction.

In view of this, in the present embodiment, the clip unit 220, which restricts the output voltage of the differential amplifier 207, is provided so as to keep the differential amplifier 207 from operating in a region other than the pentode region in which the differential amplifier 207 is supposed to operate. Consequently, the differential amplifier 207 does not lose its balance, so that a potential of the drain of the NMOS transistor 218 of the differential amplifier 207 can be kept from fluctuating, and the change in a current that flows from the constant current circuit CS to the ground line L1 can be reduced.

It is sufficient that the maximum voltage V209_MAX (first clip voltage V1) of the output terminal 209 of the differential amplifier 207 is a voltage that is lower than a power supply voltage VDD supplied to differential amplifiers for all the columns.

For example, in the case of FIG. 1, it is sufficient that the maximum voltage V209_MAX is smaller than the source voltage of the transistors 243 and 244 in the differential amplifier 207 of the column signal readout unit 105c which is objected to the greatest influence from the parasitic resistances 112a to 112c in the power supply line L2 and is the farthest from the supply source of the power supply voltage among the column signal readout units 105a to 105c. That is, the first clip voltage V1 is lower than the minimum power supply voltage supplied to the amplification unit 240 of the differential amplifier 207 for all columns, and is higher than half of the power supply voltage supplied to the image sensing device 100, that is, the power supply voltage of the supply source. If the first clip voltage V1 is equal to or higher than the minimum power supply voltage of the differential amplifiers for all columns, the MOS transistor 221 may not be sufficiently turned ON so that there is a possibility that the MOS transistor 221 is unable to appropriately perform a clip operation. If the first clip voltage V1 is lower than the half of the power supply voltage of the supply source, there is a possibility that the second clip voltage V2 becomes lower than a drain potential which allows the NMOS transistor 218 to operate in the saturation region. Consequently, there is a possibility that the NMOS transistor 218 becomes unable to supply a stable current to the amplification unit 240.

For example, assuming that the parasitic resistance is 10Ω, and the average value of a flowing current is 20 mA, a usual potential drop is 200 mV, and if the power supply voltage VDD is 5 V, it is sufficient that V209_MAX (first clip voltage V1) has a value smaller than 4.8 V and greater than 2.5 V.

Further, it is sufficient that the set voltage Vpclip is equal to or lower than V209_MAX (first clip voltage V1) minus Vthp (threshold voltage of the PMOS transistor 221).

That is, the relationship $$V209\_MAX - |Vthp| > Vpclip$$

is satisfied.

On the other hand, it is sufficient that the drain voltage Vss_Clip of the PMOS transistor 221 is smaller than V209_MAX (first clip voltage V1), that is, the relationship $$V209\_MAX > Vss\_Clip$$

is satisfied.

As described above, by restricting the output voltage of a differential amplifier itself, it is possible to suppress current fluctuation of a constant current circuit of a differential amplifier when strong light enters an image sensing device. As a result, it is possible to solve the problem that a white band and black band signal level abnormality occurs in the horizontal direction in the obtained image, which cannot be suppressed only by clipping a vertical output line.

Moreover, in the present embodiment, a voltage written into the holding capacitance 214, which holds an optical signal, can be quickly made stable when a signal level to be written into the holding capacitance 214 is going to be saturated.

Figure 4:
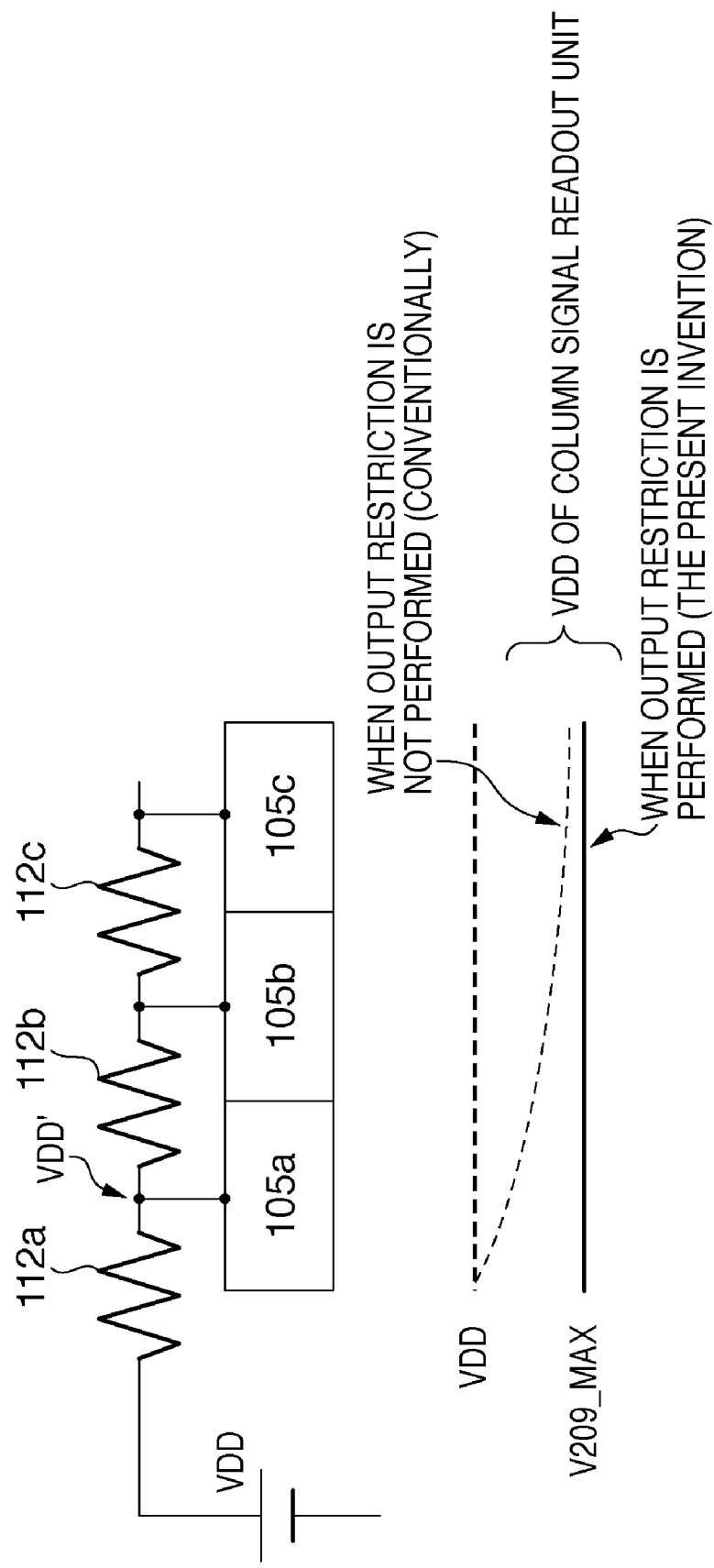
FIG. 4 illustrates effects according to an embodiment of the present invention.
Figure 5:
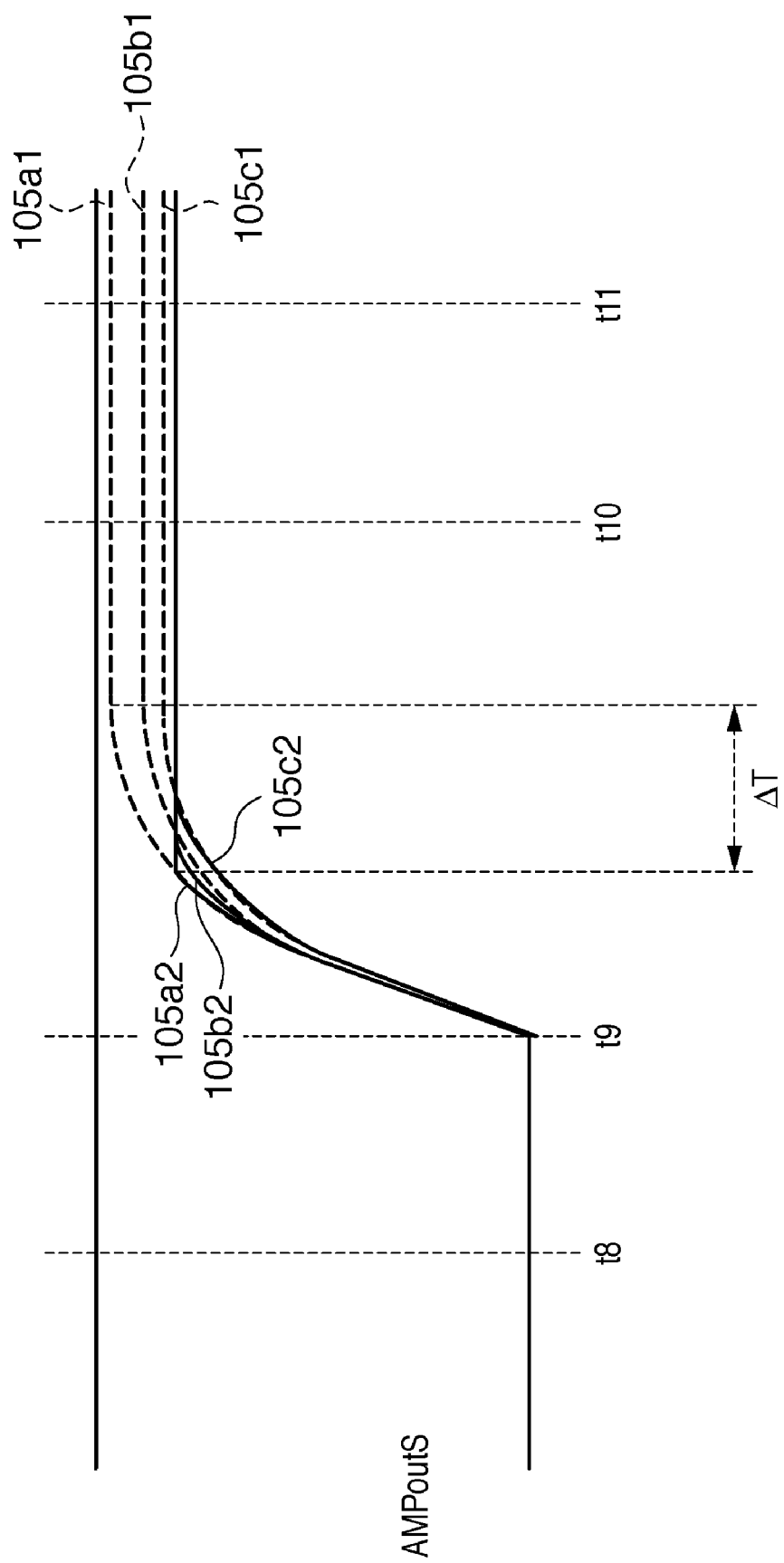
FIG. 5 illustrates effects according to an embodiment of the present invention.

Consider a case where the clip unit 220 of the differential amplifier is not arranged in the column signal readout unit 105. In this case, the maximum value of the voltage written into the holding capacitance 214 is different between each column, as shown by a dotted line in FIG. 4. In this state, as shown by dotted lines 105a1 to 105c1 in FIG. 5, it takes a long time to write a voltage close to a power supply voltage VDD into the holding capacitance 214. As a result, since a current that flows in the ground line L1 is not stable while a voltage is being written into the holding capacitance 214, there is a possibility that this cause a white band and black band in a horizontal direction in an obtained image to occur.

On the contrary, in the present embodiment, the clip unit 220 of the differential amplifier is arranged in the column signal readout unit 105 as shown in FIG. 2. In this case, the clip unit 220 restricts the output voltage of a differential amplifier to a voltage equal to or lower than V209_MAX (first clip voltage V1). Specifically, the MOS transistor 221 clips the output voltage of the differential amplifier at the first clip voltage V1 when the set voltage Vpclip corresponding to the first clip voltage V1 minus the threshold voltage is supplied to its gate. Accordingly, the maximum value of a voltage written in the holding capacitance 214 is equivalent to each column as shown by a solid line in FIG. 4. In this state, as shown by solid lines 105a2 to 105c2 in FIG. 5, since it is not necessary to write a voltage close to a power supply voltage VDD into the holding capacitance 214, the time to write a voltage into the holding capacitance 214 can be shortened by for example AT. As a result, it is possible to reduce an influence (i.e. a white band and black band in a horizontal direction) on image quality due to an unstable current that flows in the ground line L1 while a voltage is being written into the holding capacitance 214.

Figure 6:
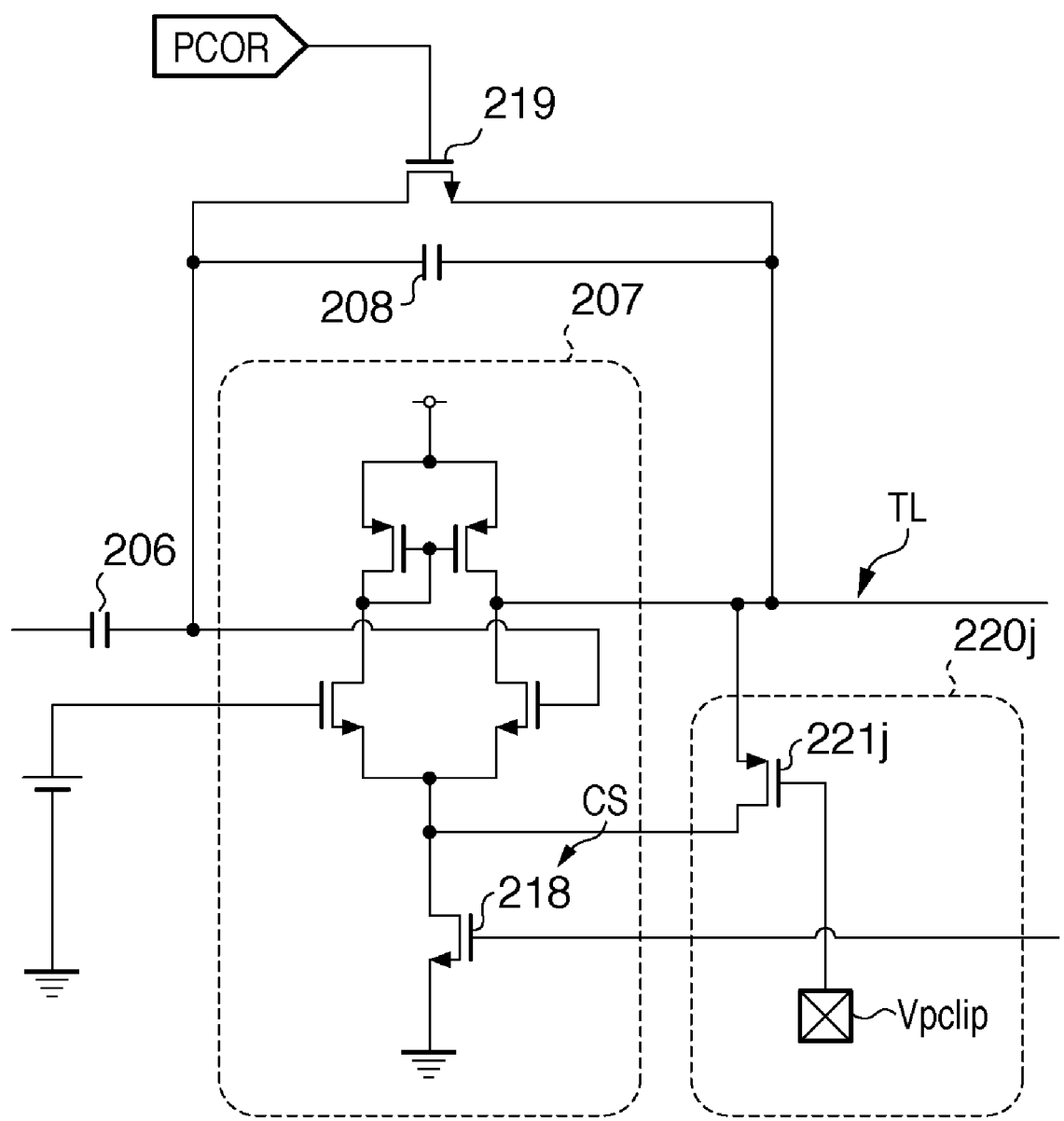
FIG. 6 is a diagram showing the configuration of a clip unit in a modified embodiment of the present invention.

Note that as shown in FIG. 6, a MOS transistor 221j in a clip unit 220j may be a PMOS transistor whose drain is connected to the constant current circuit CS, and whose source is connected to the transmission line TL. In this case, the current that flows from the power supply line L2 to the differential amplifier 207 can be made stable and, also, a current consumption by the differential amplifier 207 can be suppressed.

Figure 7:
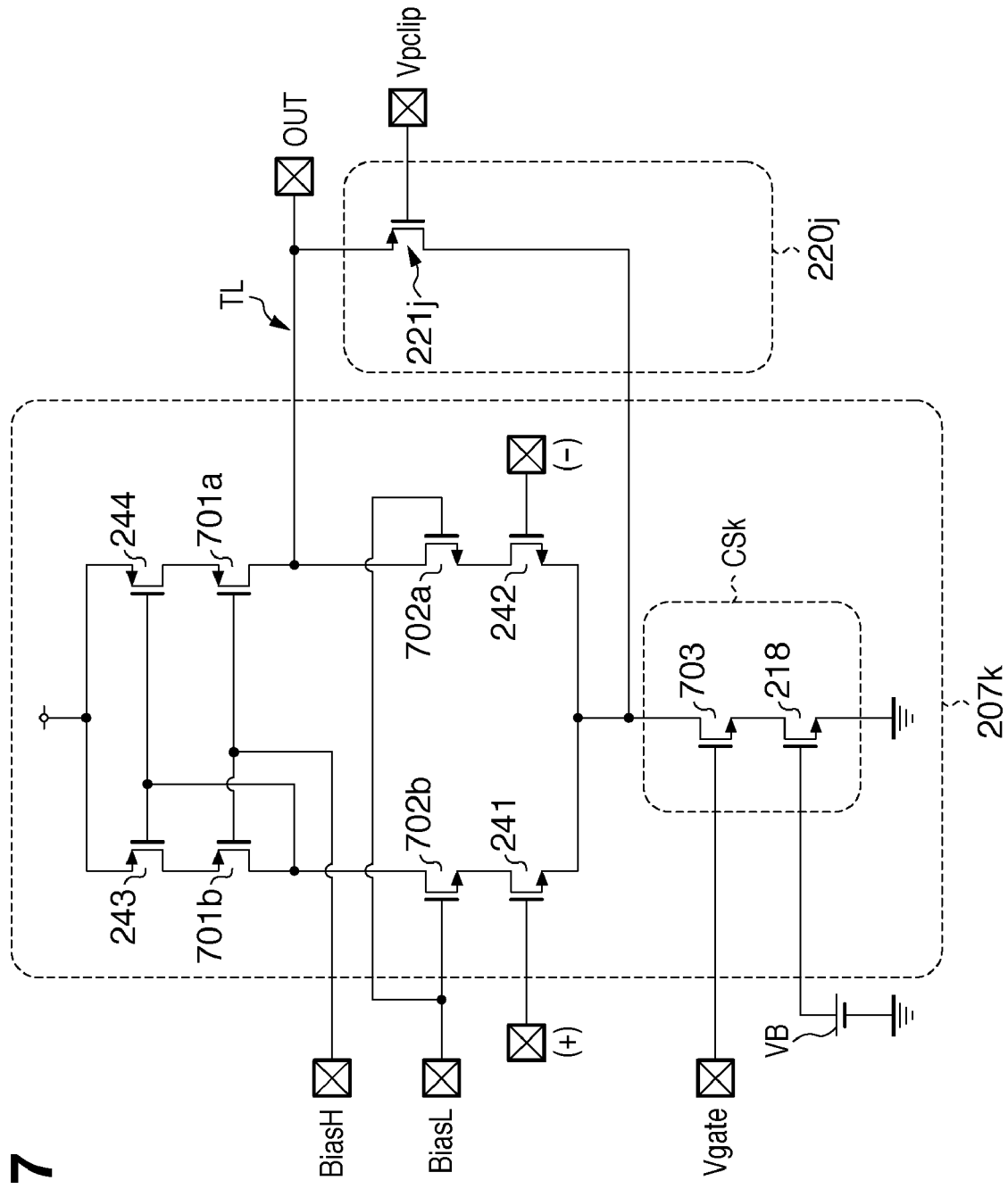
FIG. 7 is a diagram showing the configuration of a differential amplifier in a further modified embodiment of the present invention.

Also, as shown in FIG. 7, a differential amplifier 207k may further include common gate transistors 701a, 701b, 702a, 702b, and 703.

Specifically, the common gate transistor 701a is a PMOS transistor whose source is connected to the drain of the transistor 244, and whose drain is connected to the drain of the common gate transistor (NMOS transistor) 702a. The common gate transistor 701b is a PMOS transistor whose source is connected to the drain of the transistor 243, and whose drain is connected to the drain of the common gate transistor (NMOS transistor) 702b. A common bias voltage BiasH is supplied to the gates of the common gate transistors 701a and 701b. The common gate transistor 702a is an NMOS transistor whose source is connected to the drain of the input transistor 242, and whose drain is connected to the drain of the common gate transistor 701a. The common gate transistor 702b is an NMOS transistor whose source is connected to the drain of the input transistor 241, and whose drain is connected to the drain of the common gate transistor 701b. A common bias voltage BiasL is supplied to the gates of the common gate transistors 702a and 702b. This increases the gain of the differential amplifier 207k.

Further, the common gate transistor 703 is an NMOS transistor and is included in a constant current circuit CSk together with an NMOS transistor (load transistor) 218. The source of the common gate transistor 703 is connected to the drain of the NMOS transistor 218. The drain of the common gate transistor 703 is connected to the sources of the input transistors 241 and 242 and to the drain of the MOS transistor 221j. A constant bias voltage Vgate is supplied to the gate of the common gate transistor 703. This suppresses the fluctuation of current supplied from the NMOS transistor 218.

That is, by taking a configuration as shown in FIG. 7, the gain of the differential amplifier can be increased and, also, it is possible to suppress white and black bands in the horizontal direction that remarkably occur in an obtained image when a gain of the differential amplifier is set to be high.

Figure 8:
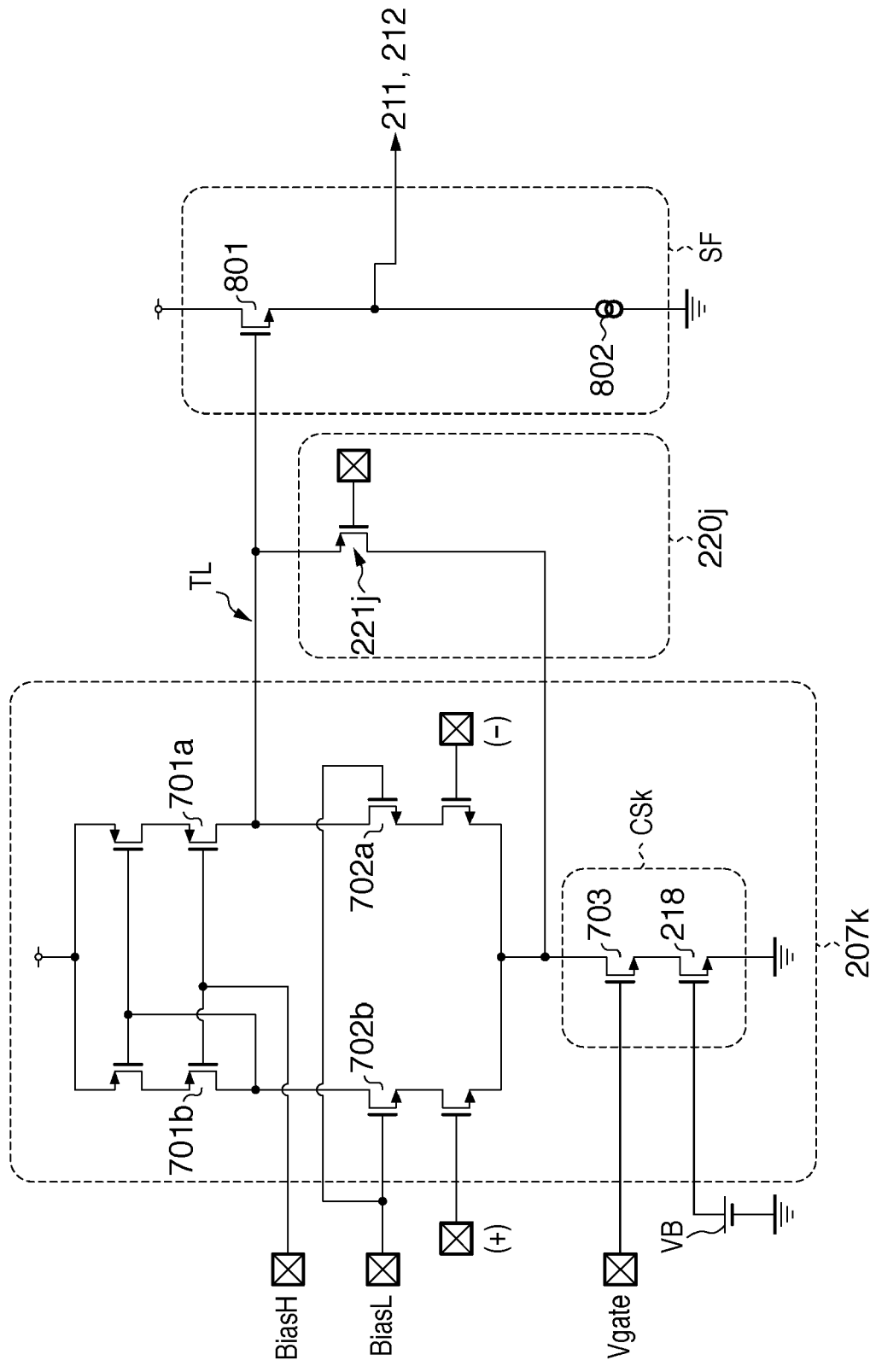
FIG. 8 is a diagram showing the configuration of a source follower circuit in a further modified embodiment of the present invention.

Furthermore, as shown in FIG. 8, a source follower circuit SF may be provided between the differential amplifier 207k and the switches 211 and 212 (see FIG. 2). The source follower circuit SF includes an NMOS transistor 801 and a constant current source 802. The gate of the NMOS transistor 801 is connected to the transmission line TL, its drain is connected to a power supply voltage, and its source is connected to the constant current source 802. With this configuration, even when the external load is large, it is possible to drive the external load.

Figure 9:
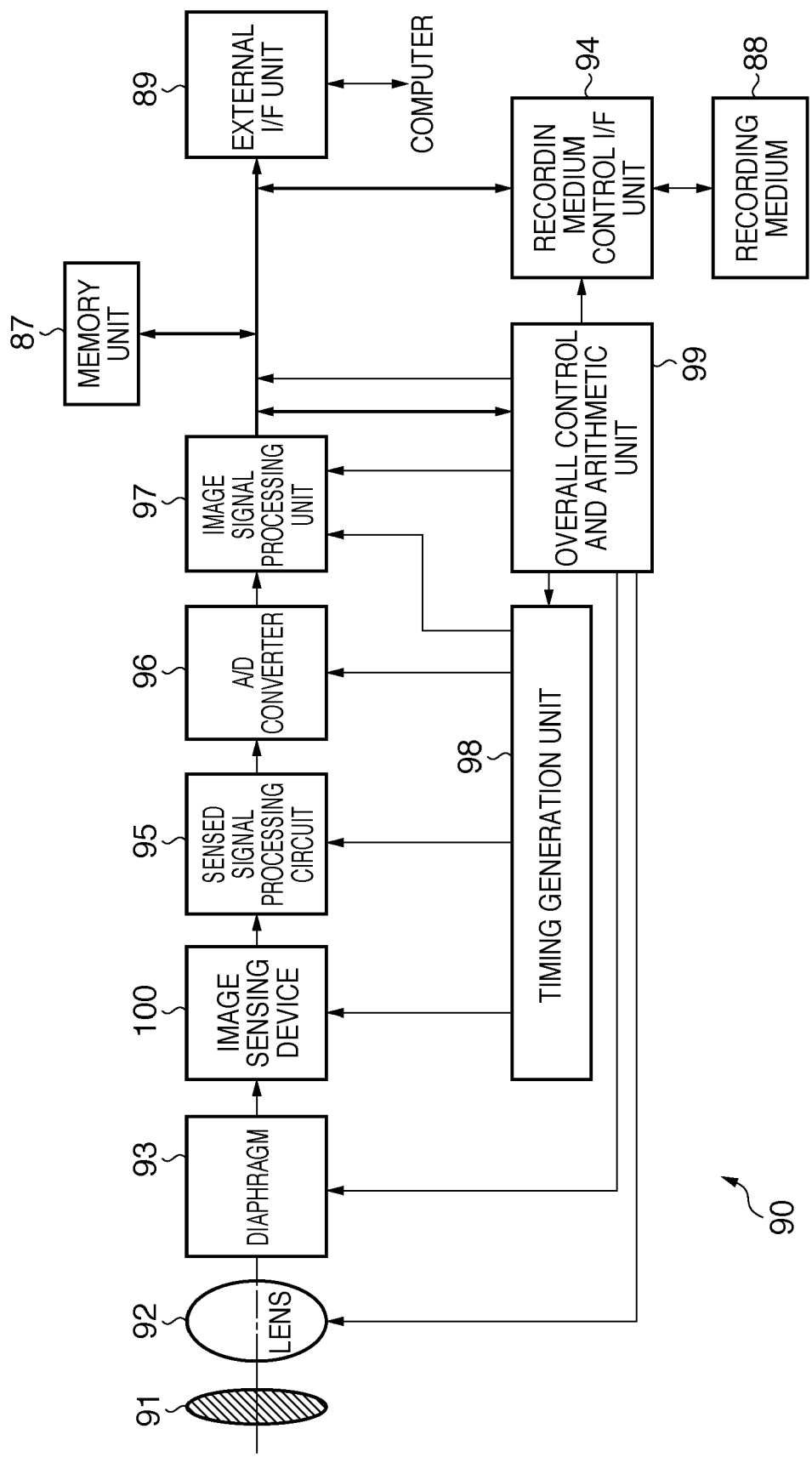
FIG. 9 is a configuration diagram of an imaging system to which an image sensing device according to an embodiment has been applied.

An example of an imaging system in which an image sensing device of the present invention has been applied is shown in FIG. 9.

As shown in FIG. 9, an imaging system 90 mainly comprises an optical system, the image sensing device 100, and a signal processing unit. The optical system mainly comprises a shutter 91, a lens 92, and a stop 93. The signal processing unit mainly includes a sensed signal processing circuit 95, an A/D converter 96, an image signal processing unit 97, a memory unit 87, an external I/F unit 89, a timing generation unit 98, an overall control and arithmetic unit 99, a recording medium 88, and a recording medium control I/F unit 94. It should be noted that the signal processing unit is not necessarily included in the recording medium 88.

The shutter 91 is provided in an optical path in front of the lens 92 and controls exposure.

The lens 92 refracts light that has entered so as to form an image of an object on the pixel array (image sensing surface) of the image sensing device 100.

The stop 93 is provided in the optical path between the lens 92 and the image sensing device 100, and adjusts amounts of light that are guided to the image sensing device 100 after passing through the lens 92 .

The image sensing device 100 converts the image of the object formed on the pixel array into image signals. The image sensing device 100 reads out and outputs the image signals from the pixel array.

The sensed signal processing circuit 95 is connected to the image sensing device 100 and processes the image signals that have been output from the image sensing device 100.

The A/D converter 96 is connected to the sensed signal processing circuit 95, and converts the image signals (analog signals) that have been output after processing from the sensed signal processing circuit 95 into image signals (digital signals).

The image signal processing unit 97 is connected to the A/D converter 96, and performs arithmetic processing such as various kinds of corrections on the image signals (digital signals) output from the A/D converter 96 so as to generate image data. This image data is supplied to the memory unit 87, the external I/F unit 89, the overall control and arithmetic unit 99, the recording medium control I/F unit 94, and the like.

The memory unit 87 is connected to the image signal processing unit 97, and stores image data that has been output from the image signal processing unit 97.

The external I/F unit 89 is connected to the image signal processing unit 97. In this way, image data that has been output from the image signal processing unit 97 is transferred to external devices (personal computers and the like) via the external I/F unit 89.

The timing generation unit 98 is connected to the image sensing device 100, the sensed signal processing circuit 95, the A/D converter 96, and the image signal processing unit 97. In this way, timing signals are supplied to the image sensing device 100, the sensed signal processing circuit 95, the A/D converter 96, and the image signal processing unit 97. And the image sensing device 100, the sensed signal processing circuit 95, the A/D converter 96, and the image signal processing unit 97 operate in synchronization with the timing signals.

The overall control and arithmetic unit 99 is connected to the timing generation unit 98, the image signal processing unit 97, and the recording medium control I/F unit 94, and performs overall control of the timing generation unit 98, the image signal processing unit 97, and the recording medium control I/F unit 94.

The recording medium 88 is detachably connected to the recording medium control I/F unit 94. In this way, image data that has been output from the image signal processing unit 97 is recorded to the recording medium 88 via the recording medium control I/F unit 94.

With this configuration, excellent images (image data) can be obtained if excellent image signals can be obtained by the image sensing device 100.

Although a specific description has been given above regarding the present invention, the present invention is not limited to an individual embodiment, and can be altered and can be added as appropriate within the scope of the invention.

In the above-described embodiments, although a description has been given regarding a configuration in which a signal is amplified in a pixel as a pixel structure, the configuration can be modified into other than that. For example, the present invention can be applied to a configuration in which a pixel has only a photoelectric conversion unit and a transfer unit, and a signal generated by the photoelectric conversion unit is only output to a signal line via the transfer unit. Alternatively, in the case of a line sensor, an amplification unit may be provided corresponding to each pixel without providing a transfer unit in a pixel. The present invention is not particularly limited with regard to the pixel configuration, and it is sufficient that the present invention has a configuration in which a plurality of amplification units amplify signals that are output in parallel from a pixel array in which a plurality of pixels are arrayed.

Although cases of using electrons as signal charges have been described, it is also possible to modify the embodiments such that holes are used as signal charges by changing polarities of the signal voltages.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-222794, filed Aug. 29, 2008 which is hereby incorporated by reference herein in its entirety.

What is claimed is:

1. An image sensing device comprising:
a pixel array in which a plurality of pixels are arrayed; and
a plurality of column amplification units that amplify a plurality of signals that are output in parallel from the pixel array,
wherein each of the plurality of column amplification units includes:
a differential amplifier including an amplification unit and a current source circuit, the amplification unit amplifying a signal that is output from the pixels and outputting the amplified signal to an output node, the current source circuit being arranged between the amplification unit and a first potential line and supplying a current to the amplification unit;
a clip unit that clips a voltage of the output node when the differential amplifier amplifies the signal and thereby clipping a voltage of a node between the amplification unit and the current source circuit; and
a second potential line commonly connected to the current source circuits of the plurality of column amplification units to control the current to each of the plurality of amplification units.

2. The image sensing device according to claim 1, wherein each of the pixels includes:
a photoelectric conversion unit;
a charge-voltage converter that converts charges to a voltage;
a transfer unit that transfers charges generated by the photoelectric conversion unit to the charge-voltage converter;
a reset unit that resets the charge-voltage converter; and
an output unit that outputs a signal corresponding to a voltage of the charge-voltage converter to a signal line,
and wherein, in the pixel, the output unit outputs a noise signal corresponding to a voltage of the charge-voltage converter to the signal line in a state where the reset unit has reset the charge-voltage converter, and the output unit outputs an optical signal corresponding to a voltage of the charge-voltage converter to the signal line in a state where the transfer unit has transferred charges from the photoelectric conversion unit to the charge-voltage converter,
the amplification unit amplifies each of the noise signal and the optical signal that have been output from the pixel in each column to the signal line and outputs the amplified signals to the output node, or amplifies a difference signal corresponding to a difference between the optical signal and the noise signal that have been output from the pixel in each column to the signal line and outputs the amplified signal to the output node, and
the clip unit clips a voltage at the connection node connecting the amplification unit to the constant current circuit in the differential amplifier by clipping a voltage at the output node when the differential amplifier amplifies the optical signal or the difference signal.

3. The image sensing device according to claim 2, wherein the clip unit clips a voltage at the output node of the differential amplifier at a first clip voltage when the differential amplifier amplifies the optical signal or the difference signal, and thereby clips the voltage at the connection node in the differential amplifier at a second clip voltage that is lower than the first clip voltage.

4. The image sensing device according to claim 3, wherein the differential amplifier and the clip unit are provided with respect to the pixel in each column, and
the first clip voltage is lower than a minimum power supply voltage supplied to the amplification units of the differential amplifiers for all columns, and is higher than half of a power supply voltage supplied to the image sensing device.

5. The image sensing device according to claim 3, wherein each of the column amplification units further includes:
a holding capacitance that holds an optical signal or a difference signal that have been output from the output node of the differential amplifier; and
a transmission line that connects the output node to the holding capacitance, and the clip unit includes a MOS transistor having a source connected to the transmission line, a drain connected to a reference voltage, and a gate supplied with a set voltage which causes a voltage of the source to be the first clip voltage when the MOS transistor is turned ON.

6. The image sensing device according to claim 3, wherein each of the column amplification units further includes:
   a holding capacitance that holds an optical signal or a difference signal that have been output from the output node of the differential amplifier; and
   a transmission line that connects the output node to the holding capacitance, and
the clip unit includes a MOS transistor having a source connected to the transmission line, a drain connected to the current source circuit of the differential amplifier, and a gate supplied with a set voltage which causes a voltage of the source to be the first clip voltage when the MOS transistor is turned ON.

7. The image sensing device according to claim 1, wherein the current source circuit includes a load transistor having a source connected to a ground, and a common gate transistor having a source connected to a drain of the load transistor, and
the clip unit clips a voltage at a connection node between the common gate transistor and the amplification unit.

8. An imaging system comprising:
the image sensing device according to claim 1;
an optical system in which an image is formed on an image sensing surface of the image sensing device; and
a signal processing unit that processes a signal output from the image sensing device so as to generate image data.

9. An image sensing device comprising:
a pixel array in which a plurality of pixels are arrayed; and
a plurality of column amplification units that amplify a plurality of signals that are output in parallel from the pixel array,
wherein each of the plurality of column amplification units includes:
   a differential amplifier including an amplification unit and a current source circuit, the amplification unit amplifying a signal that is output from the pixels and outputting the amplified signal to an output node, the current source circuit being arranged between the amplification unit and a potential line and supplying a current to the amplification unit; and
   a clip unit that clips a voltage of the output node at a first clip voltage when the differential amplifier amplifies an optical signal, or amplifies a difference signal of the optical signal and a noise signal, and thereby clips the voltage at a node between the amplification unit and the current source circuit at a second clip voltage that is lower than the first clip voltage,
each of the plurality of column amplification units further includes:
   a holding capacitance that holds the amplified optical signal or the amplified difference signal that have been output from the output node of the differential amplifier; and
   a transmission line that connects the output node to the holding capacitance, and
the clip unit includes a MOS transistor having a source connected to the transmission line, a drain connected to the node between the amplification unit and the current source circuit, and a gate supplied with a set voltage which causes a voltage of the source to be the first clip voltage when the MOS transistor is turned ON.

10. An image sensing device comprising:
a pixel array in which a plurality of pixels are arrayed; and
a plurality of column amplification units that amplify a plurality of signals that are output in parallel from the pixel array,
wherein each of the plurality of column amplification units includes:
   a differential amplifier including an amplification unit and a current source circuit, the amplification unit amplifying a signal that is output from the pixels and outputting the amplified signal to an output node, the current source circuit being arranged between the amplification unit and a ground terminal and supplying a current to the amplification unit; and
   a clip unit that clips a voltage of the output node when the differential amplifier amplifies the signal and thereby clipping a voltage of a node between the amplification unit and the current source circuit,
wherein the current source circuit includes a load transistor having a source connected to a ground, and a common gate transistor having a source connected to a drain of the load transistor and a drain connected the node between the amplification unit and the current source circuit, and
the clip unit includes a MOS transistor having a source connected to the transmission line, a drain connected to the node between the amplification unit and the current source circuit, and a gate supplied with a set voltage which causes a voltage of the source to be the first clip voltage when the MOS transistor is turned ON.

* * * * *